A. A. HORTON.
MOTOR CYCLE FRAME.
APPLICATION FILED JAN. 21, 1911.

1,010,142.  Patented Nov. 28, 1911.

Witnesses
O. B. Baenziger.
V. C. Spratt.

Inventor
Allen A. Horton
By Parker W. Burton
Attorneys

UNITED STATES PATENT OFFICE.

ALLEN A. HORTON, OF DETROIT, MICHIGAN.

MOTOR-CYCLE FRAME.

1,010,142.  
Specification of Letters Patent.  
Patented Nov. 28, 1911.

Application filed January 21, 1911. Serial No. 603,816.

*To all whom it may concern:*

Be it known that I, ALLEN A. HORTON, a citizen of the United States, residing at Detroit, county of Wayne, State of Michigan, have invented a certain new and useful Improvement in Motor-Cycle Frames, and declare the following to be a full, clear, and exact description of the same, such as will enable others skilled in the art to which it pertains to make and use the same, reference being had to the accompanying drawings, which form a part of this specification.

This invention relates to motor cycle frames.

It has for its object an improved connection between that part of the frame which carries the engine and that part of the frame to which the rear wheel is secured by means of which the rear wheel is permitted to rise and fall through a considerable range of movement without changing its band distance from the driving shaft of the engine. This is effected by constructing a system of links which unite the parts and which have their centers of movement so arranged that the axle of the wheel may rise and fall in the arc of a circle which is concentric with the shaft of the engine.

Figure 1:
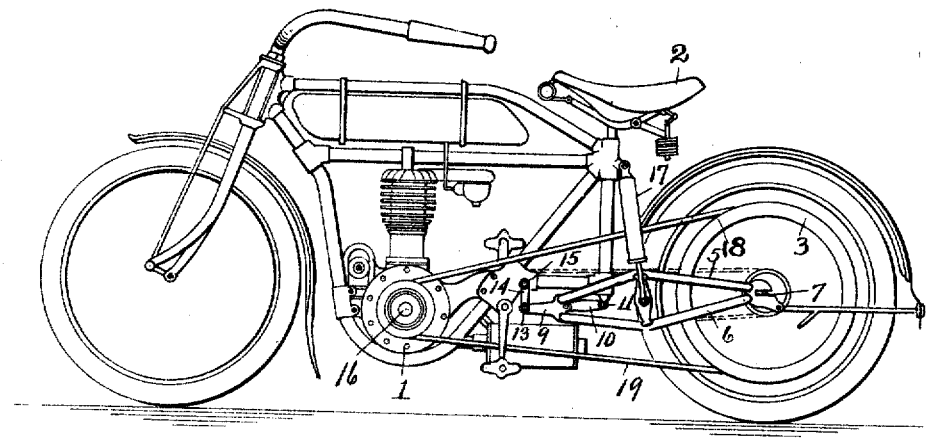
Figure 2:
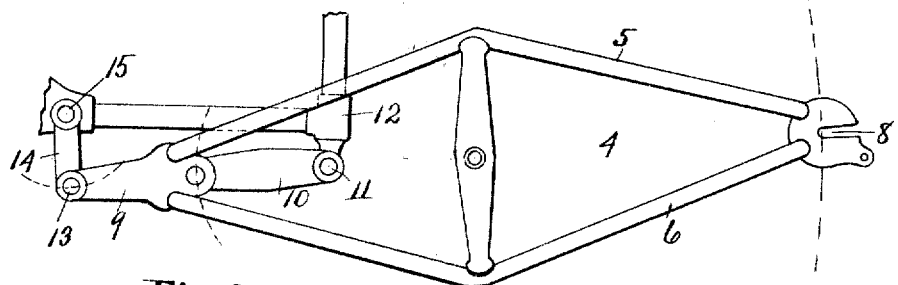
Figure 3:
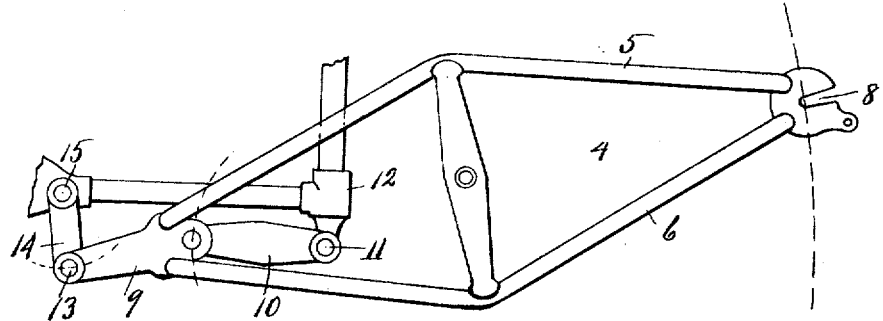

In the drawings:—Figure 1, is a side elevation of the motor cycle with the links in place. Fig. 2, is a side elevation showing the linkage which connects the rear wheel to the frame. Fig. 3, shows the same linkage in a different position.

The engine 1 is secured in the ordinary way upon the frame which supports the seat 2, and the other adjuncts of the machine, and has connected with it the rear wheel 3 which is secured between a pair of link bars (seen in elevation in Figs. 2 and 3). The main bar 4, which is a compound or trussed bar, consisting of members 5 and 6, and provided at one end with a seat 8 in which the axle 7 of the wheel engages, and at the other end, members of the trussed bar are engaged by fork member 9 which is pivotally connected to a link 10 and pivotally connected to a link 14; the link 10 is connected by pivot 11 to a fixed part 12 of the frame, and the fork 9 and the link 14 are pivotally connected to the frame 12 by pivot 15. The two links 10 and 14 swing in arcs which are substantially at right angles one to the other and are proportioned to give to the free end of the trussed member which contains the seat 8 a path that is very nearly in the arc of a true circle having its center at the center of the shaft 16 of the engine so closely that in a movement of several inches vertically the deviation from a true circle is so small as to be negligible. The link 4 is supported to the frame by a spring contained in the spring casing 17. By means of this arrangement it is provided that a driven belt wheel 18 on the rear wheel maintains its proper relative distance from the axle 16 of the engine at all times, and the belt 19 takes its proper condition of strain. Provision is made for adjusting the strain of the belt by shifting the axle 7 along the seat 8 in the ordinary way, the details of which are not shown as they form no part of this invention.

What I claim is:—

1. As a means of causing the free end of the link to move concentric to a given point, a link hanging from the frame having an end swinging in a substantially horizontal plane, a second link hanging from the frame having its moving end adapted to move in a substantially vertical arc, and a link pivoted to the horizontal moving end of the first-mentioned link and to the vertical moving end of the second-mentioned link, substantially as described.

2. In a motor cycle, the combination of an engine, a shaft driven thereby, a frame supporting said engine, a rear wheel, a main bar in which said rear wheel is seated, a band passed over the shaft and adapted to revolve the rear wheel, a link connecting the said main bar to the frame and normally lying horizontal, and a second link connecting said bar to the frame and normally lying in vertical position, the said links being arranged between the engine and rear wheel and adapted to confine the oscillation of the rear wheel to an arc approximately concentric to the shaft, thereby maintaining an unvarying tension of the band, substantially as described.

3. In a motor cycle, the combination of an engine, a shaft driven thereby, a frame supporting said engine, a rear wheel, a main bar comprising truss bars at the rear end of which the said wheel is seated, a fork bar attached to the opposite end of said truss bars, a link connecting the forked member to the frame and adapted to oscillate in a substantially vertical arc, a second link forward of the first-mentioned link connecting said forked member to the frame member and adapted to oscillate in a substantially horizontal arc, the said links being arranged to confine the oscillation of the rear wheel to an arc approximately concentric to the shaft, and a band passed over the shaft and adapted to revolve the rear wheel, whereby an unvarying tension of the band is maintained, substantially as described.

In testimony whereof, I sign this specification in the presence of two witnesses.

ALLEN A. HORTON.

Witnesses:
WILLIAM M. SWAN,
CHARLES C. JENNINGS.